United States Patent Office 3,193,494
Patented July 6, 1965

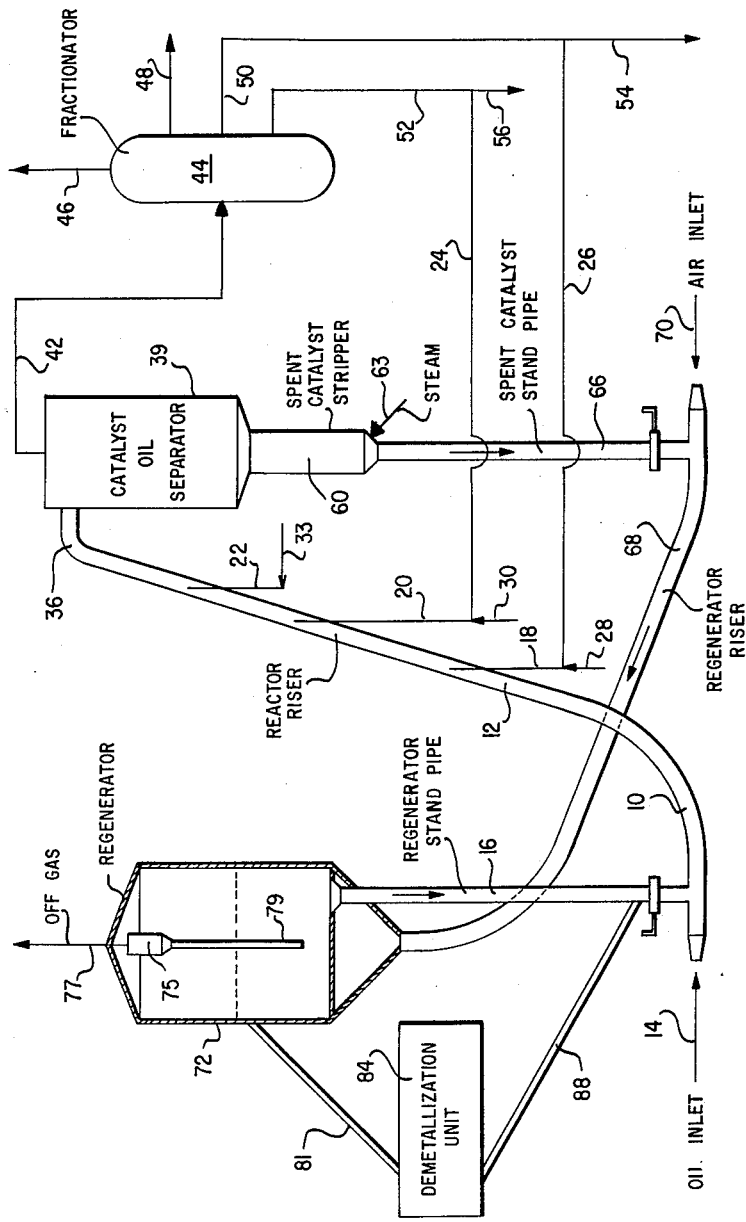

3,193,494
PROGRESSIVE FLOW CRACKING OF CONTAMINATED HYDROCARBON FEEDSTOCKS
Robert A. Sanford, Homewood, and Earl C. Gossett, South Holland, Ill., assignors to Sinclair Research, Inc., Wilmington, Del., a corporation of Delaware
Filed July 24, 1962, Ser. No. 212,054
13 Claims. (Cl. 208—120)

This invention is a method for cracking a hydrocarbon feedstock employing a catalyst which is resistant to the poisoning effects of metals in the feedstock. The method may include demetallization of the catalyst when the poisoning metal reaches a high level.

It has been proposed to subject a heavy petroleum hydrocarbon charge stock to cracking conditions in the presence of finely divided solid catalyst under conditions of progressive flow and reaction to give a significant improvement in product distribution, e.g. increased gasoline yield, for any given conversion level. Progressive reaction may be achieved by flowing powdered catalyst and oil vapor concurrently through an elongated reaction zone at a high enough velocity to prevent forward-backward mixing for great improvement in product distribution results. Also, as disclosed in U.S. Patent No. 2,908,630, such a progressive reaction manipulation may be advantageously applied to the processing of a plurality of hydrocarbon feedstocks. In the method outlined in this patent, the portion of petroleum hydrocarbon charge stock to be converted containing relatively high proportions of light, somewhat refractory hydrocarbon components and low proportions of coke-forming constituents, is vaporized and mixed with finely divided catalyst to form a suspension which is passed rapidly upward through an elongated, vertically extending reaction path. The remaining portion of the petroleum hydrocarbon charge stock containing relatively high proportions of coke-forming constituents, which usually also are easier to crack, is charged to the reaction flow path at a single point or at several points further along the confined reaction flow path. This method has particular advantages where cycle oil is sent to processing along with virgin oil components. By introducing the cycle stock at a later point of the reaction zone, the paraffins and naphthenes in the virgin oil component have time to contact the catalyst alone. The catalyst is more active during the first portion of the reaction, being substantially free from the bicyclic aromatics which a catalyst usually absorbs immediately from most cycle stocks and rapidly converts into coke. Also, the progressive reaction sometimes enables different temperatures and contact mechanisms to be employed in different parts of the reaction zone, to provide conditions more suitable for each feedstock to the reaction.

When other stocks which are high in Conradson carbon number, for example, deasphalted gas oil produced by solvent extraction of reduced crude, are also to be fed to the catalytic cracking these, likewise, are fed to later stages of the progressive flow system. Besides coke formers, many of these feedstocks which are advantageously fed to the later zones in the progressive reaction described also contain metal contaminants. In this invention a progressive conversion reaction, also known as "riser cracking," is conducted using a defined catalyst which resists the deleterious effects of metal contaminants.

One of the most important phases of study in the improvement of catalyst performance in hydrocarbon conversion is in the area of metals poisoning. Although referred to as "metals," these catalyst contaminats may be in the form of free metals or relatively non-volatile metal compounds. It is to be understood that the term "metal" used herein refers to either form. Various petroleum stocks have been known to contain at least traces of many metals. For example, Middle Eastern crudes contain relatively high amounts of several metal components such as nickel and vanadium, while Venezuelan crudes are noteworthy for their vanadium content and are relatively low in other contaminating metals such as nickel. In addition to metals naturally present, including some iron, petroleum stocks have a tendency to pick up tramp iron from transportation, storage and processing equipment.

Most of the catalysts which are conventionally used in cracking processes are very sensitive to metals such as iron, nickel, vanadium and copper in the feedstock, which deposit in a nonvolatile form on the catalyst and are not removable in ordinary regeneration. These metals markedly alter the selectivity and activity of conventional cracking catalyst if allowed to accumulate, producing a higher yield of coke and hydrogen at the expense of desired products, such as gasoline and butanes. Metal poisons have an even more pronounced adverse effect on progressive flow reactions where high activity in the catalyst is most necessary if optimum results are to be obtained in the very short period of contact between the catalyst and the feedstock.

Refiners usually cope with the problem of metal poisoning by adopting several techniques. One technique includes selecting only feedstocks of low metal content or treating the feedstock to minimize its metal content. Another technique requires removing from the hydrocarbon conversion system of as much metal as is fed to it per unit time, in order to obtain and retain a total amount of metal in the system below a level where the conversion process is made economically unfeasible by the poisoning effect of the metal. In most conversion procesess some metal-containing catalyst is continually lost to the system in the form of fines which leave the system with effluent gases. The replacement of this loss with fresh unpoisoned catalyst reduces the net amount of metal in the system. In addition, the refiner usually will purposely remove enough poisoned catalyst from the system per unit time so that replacement with unpoisoned or less poisoned catalyst will keep the metal level at the desired equilibrium. The removed catalyst may be discarded as a waste material, or, using recently developed techniques, the catalyst may be demetallized and returned to the system.

In this invention the contaminating and deactivating effects of nickel in a feedstock may be substantially avoided by employing a cracking catalyst more resistant to metals, especially nickel, than conventional cracking catalysts, so that metals accumulation on the catalyst has less poisoning effect on the system. In operating with this catalyst, the petroleum refiner can feed more highly contaminated feedstock to the later stages of the progressive flow reaction and may allow more metals to accumulate on the catalyst than on a conventional catalyst, without severe, economically disadvantageous, effects on the conversion. By providing for a greater metals accumulation, that is, by operating at a higher equilibrium metal level, the inevitable stack loss of catalyst fines allows removal of more metal from the system. Thus less catalyst needs to be purposely discarded or demetallized to keep the proper conversion efficiency with a feedstock of a given metal content.

Cracking of heavier hydrocarbon feedstocks to produce hydrocarbons of preferred octane rating boiling in the gasoline range is widely practiced and conventionally uses a solid oxide catalyst to give end products of fairly uniform composition. The catalysts which have received the widest acceptance today are usually activated or calcined predominantly silica or silica-based, e.g. silica-magnesia, silica-zirconia, silica-alumina, etc., compositions in a state of slight hydration and containing small amounts of acidic oxide promoters in many instances. These oxides or more-or-less homogeneous oxide mixture compositions sometimes may also contain small amounts of other inorganic materials, but current practice in catalytic cracking leans more toward the exclusion from the silica materials of foreign constituents such as alkaline metal salts which may cause sintering of the catalyst surface on regeneration and a drop in catalytic activity. For this reason, the use of wholly or partially synthetic gel catalysts, which are more uniform and less damaged by high temperatures in treatment and regeneration, is often preferable. Such homogeneous catalysts, however, are sensitive to the poisoning effects of nickel in the feedstock, while the catalyst used in this invention is almost insensitive to the effect of nickel at moderate levels. The catalyst comprises a synthetic alumina gel precipitated on or mixed with a silica-alumina substrate.

The substrate is a solid inorganic oxide mixture, generally a clay or a synthetic silica-alumina gel. The substrate usually contains at least about 40% silica and often is predominantly silica. Preferably the substrate contains alumina, generally in an amount of at least about 5 to 50% and the combined silica and alumina content is at least about 85 or 90% of the substrate, the remainder, if any, generally comprising other inorganic oxides, such as those found originally in the clay, or added for additional promoting effects. The substrate may be derived from one of the clays conventionally used in catalytic cracking, such as halloysite or dehydrated halloysite (kaolinite) or bentonite. In most cases it is desirable to treat the clay with mineral acid for purposes of activation. The substrate may also be a completely synthetic-gel oxide material, which may be silica-based and ordinarily contains a substantial amount of a gel or gelatinous precipitate comprising a major portion of silica and at least one other material, such as alumina, magnesia, zirconia, etc.

The substrate is in the form of recognizable particles. While the size range of the particles is not of the utmost significance, the particles are greater than colloidal in size, that is, they are larger than the miscelles, the submicronic particles which make up a colloid. Generally, the substrate particles will be of fluidizable size or smaller, that is, no larger than about 20–150 microns. The substrate particles may be characterized by their lack of electric charge and the fact that they do not disperse to form a colloid when placed in an aqueous medium, and even if severely agitated, do not form a true, stable, colloidal suspension but rather settle, on standing, to leave a supernatant liquid. Also, particles suitable for forming the substrate do not grow by accretion or inorganic polymerization with each other. The silica-based gel substrate is generally prepared for alumina deposition by being washed, dried, if desired, and sized. Although there usually is no need for calcination before alumina addition, this may be performed and the substrate will usually exhibit cracking activity upon calcination.

Hydrated alumina gel can be mixed with the substrate particles to form the catalyst. Alternatively the alumina gel can be prepared in the presence of the substrate particles. Preferably the hydrated gel is formed by reacting ammonia with an aqueous solution of an aluminum salt after which the alumina hydrate or alumina hydrate-substrate slurry is washed and the hydrate concentrated as by settling and the aqueous material filtered off. The aluminum salt is generally a sulfate, such as $Al_2(SO_4)_3$ or $NH_4Al(SO_4)_2$. The solution may contain a concentration of about 5 to 20% aluminum salt and the ammonia will generally be added as ammonia water until the desired amount of alumina hydrate is precipitated. During the formation of the alumina hydrate the pH is generally controlled to produce certain characteristics in the alumina hydrate. For example, a catalyst formed from a substrate plus alumina precipitated at a pH greater than 10 has good resistance to nickel. Preferably, however, the catalyst is prepared by precipitation of hydrous alumina in the presence of the substrate, at a pH of about 5 to 9. These conditions serve to give a catalyst having the precipitated alumina substantially entirely in the amorphous form as determinable by standard monochromatic X-ray diffraction using a tungsten target. Preferably this hydrated alumina gel is formed at a pH of about 7 to 7.5. Pricipitation of alumina from an aqueous solution of an alkali aluminate by addition of an acid may also be employed. Also, the hydrous alumina may be precipitated by hydrolysis from alcohol solutions of aluminum alkoxides although the use of inorganic salts is preferred. The alumina produced in the presence of the substrate and at the lower pH conditions described, is, upon calcination, mostly amorphous, as distinguished from alumina precipitated at higher pH's, which is crystalline in its form. Generally, about 3 to 100 parts of the hydrous synthetic alumina (dry basis), preferably 10 to 25 parts of alumina, are combined with 100 parts of substrate (dry basis). Thus the finished catalyst contains about 3 to 50% of synthetic alumina on the substrate, preferably about 9 to 20% and the total alumina content of the catalyst is between about 20 and 65 percent, preferably around 25 to 50% on a dry basis. For example, about 10 to 20 parts synthetic alumina hydrate gel may be added to or mixed with about 100 parts of an acid-treated clay containing about 20% alumina to give a catalyst having a total alumina (natural and synthetic) content of about 27 to 33%. After precipitation, the alumina hydrate-substrate slurry is washed and the hydrate concentrated as by settling, and the aqueous material is filtered off, after which the catalyst precursor is thoroughly washed to remove sulfate or other interfering anions, and then dried and also, usually, calcined. As mentioned, the substrate particles will generally be provided in a fluidizable particle size and thus the resulting composite material will be suitable for direct use in this invention. Alternatively, the coated substrate may be formed to macro-shape by pelleting, extrusion, etc., dried and reground before use. The processing of this invention requires the catalyst to be in the form of a fine powder, generally, in a size range of about 20 to 150 microns.

Another advantage of the cracking process of this invention is the great resistance of the catalyst to thermal and/or steam deactivation. This greater stability is advantageous in progressive flow cracking in several ways. For example, it allows light virgin gas oil feeds to be processed at higher temperature to better overcome their refractory natures. Also, higher partial pressures of stripping steam may be employed, resulting in greater recoveries of valuable hydrocarbons and a decreased load on the regenerator, and higher regeneration temperatures may be maintained for quicker and more complete reduction in the carbon content of the regenerated catalyst. The advantages of employing a cleaner catalyst have long been known. A great advantage of this invention is the possibility of increasing the coke-burning rate by increasing the regenerator temperature. Many units are presently limited in throughput by insufficient regeneration capacity. In addition, feedstocks higher in coke-precursors can be charged if coke-burning limitations are eased by more efficient stripping and increased regenerator capacity.

In this invention, the hydrocarbon petroleum oils used as feedstock for the conversion process may be of any type normally used in catalytic cracking operations, but stocks normally considered too highly contaminated with metal are fed to the later points in the progressive flow reactions. Such usually undesirable stocks include, for example, residual and heavy distillate stocks, that is, atmospheric tower bottoms and materials derived therefrom. These stocks which are introduced at later points in the reaction zone usually contain more than one p.p.m. nickel and may contain perhaps as much as 0.05% total metals. The total feed may contain more than about one p.p.m. nickel, with or without vanadium, and the total nickel in the feed may range up to about 5 or 15 p.p.m. The cracking is ordinarily effected to produce gasoline as the most valuable product and is generally conducted at temperatures of about 750 to 1200° F., preferably about 850 to 1050° F., at pressures up to about 200 p.s.i.g., preferably about atmospheric to 100 p.s.i.g., and without substantial addition of free hydrogen to the system. Frequently there is a temperature gradient in the flow path, the higher temperature being encountered at the beginning of the path. For typical operations, the catalytic cracking of the hydrocarbon feed will normally result in a conversion of about 40 to 60 percent of the feedstock into a product boiling in the gasoline boiling range.

In this invention the portion of the petroleum hydrocarbon charge stock to be converted containing relatively low proportions of coke-forming constituents and relatively little metal contaminants, that is, less than about 1 p.p.m. metal, e.g., virgin gas oil, is vaporized and mixed with finely divided catalyst to form a suspension having a density of about 5 to 10 pounds per cubic foot and the suspension is flowed at a linear velocity exceeding about 12 or 15 feet per second. Preferably the direction of this flow is generally upwardly through an elongated vertically extended reaction path. The remaining portion or portions of the hydrocarbon charge stock containing relatively high proportions of metal contaminants is charged to the reaction flow path at a single point or at several points further along the confined reaction flow path, for example, at points in the second half of the flow path. Generally the more contaminated fractions are added further along in the flow path than less contaminated fractions. The virgin or other uncontaminated feed will generally provide about 50–99% of the total feed, more usually about 75 to 95% of the feed.

The process of this invention is distinguishable from the two-stage cracking systems described in U.S. Patents 2,921,014 and 2,956,003. In these two-stage systems virgin feed is contacted with catalyst in a progressive flow reaction zone and after separation of the catalyst from reaction products and unreacted feed, the catalyst is recontacted, without intermediate regeneration, with higher-boiling portions of the first-stage effluent in a more-or-less conventional fluidized bed. This invention provides a single progressive flow zone in which a plurality of feeds are contacted with the catalyst without an intermediate separation of catalyst from hydrocarbons or hydrocarbons from each other. The process of this invention is, therefore, distinct from such two-stage systems, although, if desired, it may serve roughly the same function as the first stage of such systems.

The catalytic conversion system also includes a regeneration procedure in which the catalyst is periodically contacted with free oxygen-containing gas in order to restore or maintain the activity of the catalyst by removing carbon. The regenerator is preferably operated under fluidized catalyst conditions and will ordinarily process about 5–60 tons of catalyst per minute, using about 2000 to 2800 standard cubic feet of air per ton of catalyst. The average residence time for a quantum of catalyst is often about 3–10 minutes. The regeneration rate is generally designed to keep the catalyst in the reactor at a carbon level up to about 1.2% and regenerated catalyst usually has a carbon content of about 0.1 to 0.5%.

As mentioned, this invention employs a feedstock more heavily contaminated with nickel than conventional hydrocarbon feeds and employs a nickel resistant catalyst. In accordance with this invention, the use of a semi-synthetic alumina-on-halloysite or kaolin clay catalyst containing about 10 to 65% alumina to crack a feedstock containing about 0.1 to 15 p.p.m. total nickel is operable economically with a catalyst having an equilibrium nickel content about two or three times as high as normally causes a severe penalty in cracking activity or selectivety. This level frequently may be "automatically" maintained by the ordinary additions of fresh catalyst to replace fines unpreventably lost in the process, as mentioned above. The catalysts employed in this invention have a further significant advantage in that procedures which have been developed for vanadium removal from a poisoned cracking catalyst may be applied to these catalysts when the vanadium level is sufficiently high, to give an improvement in further cracking. Some nickel also may be removed in some of these procedures especially when extra high nickel levels are encountered. Such metals removal gives an improvement in further cracking.

A number of procedures have been developed by which vanadium and other poisoning metals may be removed from cracking catalysts, as described, for example, in copending applications Serial No. 767,794, filed October 17, 1958, now abandoned; 849,119, filed October 28, 1959, Patent No. 3,094,405; 19,313, filed April 1, 1960, Patent No. 3,135,384; 39,810, filed June 30, 1960; 53,623, filed September 2, 1960; 54,405, filed September 7, 1960, Patent No. 3,122,510; 55,160 filed September 12, 1960, Patent No. 3,150,103; 55,703, filed September 13, 1960, now abandoned; 55,838, filed September 14, 1960, now abandoned; 67,518, filed November 7, 1960; 95,101, filed March 13, 1961, now abandoned; 115,617, filed June 8, 1961; and 167,903, filed January 22, 1962, all of which are hereby incorporated by reference. It has been found, for example, that a chlorination treatment can convert iron and vanadium to easily removable forms. It has also been found that a basic aqueous wash containing ammonium ions is suitable for removal of V poisons as reported in copending application Serial No. 39,810. Also, as pointed out in copending applications Serial No. 19,313, and 55,160, a preliminary treatment of the catalyst with molecular oxygen-containing gas is of value in improving the vanadium removed by subsequent procedures. The withdrawal of catalyst from the cracking system can be on a continuous or intermittent basis and ordinarily the catalyst will not be allowed to accumulate more than 5000 or 7500 p.p.m. of poisoning metal, but the extent of permissible accumulation varies with the type of catalyst. It may be desirable to demetallize the completely synthetic catalyst at a lower metals level than the clay-containing catalyst. Subjecting the poisoned catalyst sample to magnetic flux may be found desirable to remove any tramp iron particles which may have become mixed with the catalyst.

Treatment of the regenerated catalyst with molecular oxygen-containing gas is frequently employed to improve the removal of vanadium from the poisoned catalyst. This treatment is preferably performed at a temperature at least about 50° F. higher than the regeneration temperature, that is, the average temperature at which the major portion of carbon is removed from the catalyst. The temperature of treatment with molecular oxygen-containing gas will generally be in the range of about 1000 to 1800° F. but below a temperature where the catalyst undergoes any substantial deleterious change in its physical or chemical characteristics, preferably a temperature of about 1150 to 1350° or even as high as 1600° F. The duration of the oxygen treatment and the amount of vanadium prepared by the treatment for subsequent removal is dependent upon the temperature and the characteristics of the equipment used. If any significant amount of carbon is present in the catalyst at the start of this high-temperature treatment, the essential oxygen contact is that continued after carbon removal, which may vary from the short time necessary to produce an observable effect in the later treatment, say, a quarter of an hour to a time just long enough not to damage the catalyst. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment. The maximum practical time of treatment will vary from about 4 to 24 hours, depending on the type of equipment used. The oxygen-containing gas used in the treatment contains molecular oxygen as the essential active ingredient and there is little significant consumption of oxygen in the treatment. The gas may be oxygen, or a mixture of oxygen with inert gas, such as air or oxygen-enriched air, containing at least about 1%, preferably at least about 10% $O_2$. The partial pressure of oxygen in the treating gas may range widely, for example, from about 0.1 to 30 atmospheres, but usually the total gas pressure will not exceed about 25 atmospheres.

The catalyst may pass directly from the oxygen treatment to a vanadium removal treatment. Such treatment may be a basic aqueous wash such as described in copending patent applications Serial Nos. 767,794, and 39,810. Alternatively vanadium may be removed by a vapor treatment as described in copending application Serial Nos. 849,199, now abandoned or 115,617, filed June 8, 1961.

Vanadium may be removed from the catalyst after the high temperature treatment with molecular oxygen-containing gas by washing it with a basic aqueous solution. The pH is frequently greater than about 7.5 and preferably the solution contains ammonium ions which may be $NH_4+$ ions or organic-substituted $NH_4+$ ions such as methyl ammonium and quaternary hydrocarbon radical ammoniums. This aqueous wash solution can be prepared by addition of a dry reagent or a concentrated solution of the reagent to water, preferably distilled or deionized water. Ammonia or methylamine gas may be dissolved directly in water.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about a minute, are satisfactory, while the time of washing may last 2 to 5 hours or longer.

After the ammonium wash the catalyst slurry can be filtered to give a cake which may be reslurried with water or rinsed in other ways, such as, for example, by a water wash on the filter, and the rinsing may be repeated, if desired, several times. A repetition of the ammonium wash without other treatment seems to have little effect on vanadium removal if the first washing has been properly conducted but repetition of the basic aqueous ammonium wash after a repeated high temperature oxygen treatment usually does serve to further diminish the vanadium content of the catalyst.

Alternatively, after the high temperature treatment with oxygen-containing gas, treatment of a metals contaminated synthetic catalyst with a chlorinating agent at a moderately elevated temperature is under some conditions of value in removing vanadium and iron contaminants from the catalyst as volatile chlorides. This treatment is described in copending applications Serial Nos. 849,199; 54,532, now abandoned; 55,703; 67,518 and 83,921. Generally, the major proportion of these volatile chlorides is removed during contact with the chlorinating vapor and where the volatile chlorides are insufficiently removed, a purge with an inert gas such as nitrogen at an elevated temperature may be applied to the chlorinated catalyst. The basic aqueous ammonium wash may be used as a substitute or complement to such a purge.

A conversion to volatile vanadium chloride after the high temperature oxygen treatment preferably makes use of vapor phase promoted chlorination at a moderately elevated temperature, up to about 700° or even 1000° F., wherein the catalyst composition and structure is not materially harmed by the treatment and a substantial amount of the poisoning metals content is converted to chlorides. The chlorination takes place at a temperature of at least about 300° F., preferably about 550 to 650° F. with optimum results usually being obtained near 600° F. The chlorinating agent is essentially anhydrous, that is, if changed to the liquid state no separate aqueous phase would be observed in the reagent.

The chlorinating reagent is a vapor which contains chlorine or sometimes HCl, in combination with a promoter, preferably a carbon or sulfur compound, for example, a chlorine substituted light hydrocarbon, such as carbon tetrachloride, which may be used as such or formed in-situ by the use of, for example, a vaporous mixture of chlorine gas with low molecular weight hydrocarbons such as methane, n-pentane, etc.

The stoichiometric amount of chlorine required to convert iron, nickel and vanadium to their most highly chlorinated compounds is the minimum amount of chlorine ordinarily used and may be derived from free chlorine, combined chlorine or the mixture of chlorine with a chlorine compound promoter described above. However, since the stoichiometric amount of chlorine frequently is in a neighborhood of only 0.001 g./g. of catalyst, a much larger amount of chlorine, say about 1–40 percent active chlorinating agent based on the weight of the catalyst is generally used. The amount of chlorinating agent required is increased if any significant amount of water is present on the catalyst so that substantially anhydrous conditions preferably are maintained as regards the catalyst as well as the chlorinating agent. The promoter is generally used in the amount of about 1–5 or 10 percent or more, preferably about 2–3 percent, based on the weight of the catalyst for good metals removal; however, even if less than this amount is used, a considerable improvement in metals conversion is obtained over that which is possible at the same temperature using chlorine alone. The amount of promoter may vary depending upon the manipulative aspects of the chlorination step, for example, a batch treatment may sometimes require more promoter than a continuous treatment for the same degree of effectiveness and results. The chlorine and promoter may be supplied individually or as a mixture to a poisoned catalyst. Such a mixture may contain about 0.1 to 50 parts chlorine per part of promoter, preferably about 1–10 parts per part of promoter. A chlorinating gas comprising about 1–30 weight percent chlorine, based on the catalyst, together with one percent or more $S_2Cl_2$ gives good results. Preferably, such as gas provides 1–10 percent $Cl_2$ and about 1.5 percent $S_2Cl_2$, based on the catalyst. A "saturated" mixture of $CCl_4$ and $Cl_2$ or HCl can be made by bubbling chlorine or hydrogen chloride gas at room temperature through a vessel containing $CCl_4$; such a mixture generally contains about 1 part $CCl_4$:5–10 parts $Cl_2$ or HCl.

Conveniently, a pressure of about 0–100 or more p.s.i.g., preferably about 0–15 p.s.i.g. may be maintained in chlorination. The chlorination may take about 5 to 120 minutes, more usually about 20 to 60 minutes, but shorter or longer reaction periods may be possible or needed, for instance, depending on the linear velocity of the chlorinating and purging vapors.

Vapor phase chlorination may be employed without a promoter to provide for vanadium removal by a later aqueous wash treatment from a synthetic or semi-synthetic catalyst as described in copending applications Serial Nos. 55,838 and 167,903. The aqueous medium may be a water solution of a vanadium chelating agent or a water solution of a reducing agent. The unpromoted chlorination is conducted at more or less the same conditions as the chlorination procedure described above but the chlorinating agent consists essentially of chlorine gas itself. Such chlorination is preceded by sulfidation of the catalyst by exposure to a sulfiding vapor at elevated temperatures. The sulfiding step can be performed by contacting the poisoned catalyst with elemental sulfur vapors, or more conveniently by contacting the poisoned catalyst with a volatile sulfide, such as $H_2S$, $CS_2$ or a mercaptan. This step also serves to aid later removal of nickel when such removal is feasible, and also may be employed preceding promoted chlorination.

The contact with the sulfur-containing vapor can be performed at a pressure from atmospheric to about 1000 p.s.i.g. and an elevated temperature generally in the range of about 750 to 1600° F., preferably about 1000 to 1200° F. The preferred upper pressure limit is about 15 p.s.i.g. Other treating conditions can include a sulfur-containing vapor partial pressure of about 0.1 to 30 p.s.i.g. or more, preferably about 0.5–15 p.s.i.g. Hydrogen sulfide is the preferred sulfiding agent. The sulfiding gas may contain about 10 to 100 mole percent $H_2S$, preferably at least about 80 mole percent $H_2S$. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run, for, say, up to about 24 hours or more depending on these conditions and the severity of the poisoning. Usually about 1–6 hours is a sufficient time. Temperatures of about 900 to 1200° F. and pressures approximating 1 atmosphere or less seem near optimum for sulfiding and this treatment often continues for at least 1 or 2 hours but the time, of course, can depend upon the nature of the treating system, e.g. batch or continuous, as well as the rate of diffusion within the catalyst matrix.

It has been found that sulfidation may also cause formation of a characteristic sulfur-vanadium compound on the catalyst surface and that when the catalyst, simultaneously with or subsequent to, the sulfidation is subjected to severe agitation such as is caused by exposure to ultrasonic vibrations, particles of this compound may be pruned from the catalyst surface and may be removed by elutriation with a gas from the catalyst mass.

The amount of metal removed in practicing the procedures outlined or the proportions of each which are removed may be varied by proper choice of treating conditions. It may prove necessary, in the case of very severely poisoned catalysts, to repeat the treatment to reduce the metals to an acceptable level.

The invention will be better understood by reference to the accompanying drawing which shows a schematic representation of apparatus usable to perform the process of this invention.

In the drawing preheated oil vapors containing relatively low proportions of coke-forming constituents, for example, virgin gas oil, are charged to the inlet section 10 of reactor tube 12 by means of connection 14. Hot, freshly regenerated catalyst from catalyst regenerator standpipe 16 is suspended in the oil vapors in inlet section 10 and the resulting suspension is flowed according to the particular equipment at charge rates providing a density of about 5 to about 10 pounds per cubic foot and a flow velocity of at least about 12 or 15 feet per second upwardly through reactor tube 12. One or more petroleum hydrocarbons containing relatively higher proportions of coke-forming constituents are charged to the reactor 12 by lines 18, 20 and 22. These hydrocarbon feedstocks may be, for example, heavy recycle oil from the line 24, and light recycle oil from the line 26, or these feedstocks may be metal-containing feeds from external sources 28, 30 and 33. The effluent from reactor tube 12 is discharged, preferably tangentially, through pipebend 36 to the oil-catalyst separator 39 which may operate on a cyclone separation principle. Oil vapors leave separator 39 at the top, preferably through a series of internal cyclones and are conducted by line 42 to the fractionator 44 wherein the vapors may be cooled and separated into fractions, for example, fixed gases which leave by line 46, gasoline fractions which leave by line 48, light and heavy gas oils which may be drawn from the fractionator by lines 50 and 52 respectively for recycle by lines 26 and 24 or removal from the system by lines 54 and 56.

Catalyst disengaged in separator 39 settles in the lower section and passes by gravity into stripper section 60 which may be contacted by steam from the line 63 to strip adsorbed hydrocarbon from the catalyst surface. From stripper 63 catalyst flows into standpipe 66 and thence to regenerator riser 68. Catalyst entering this riser is picked up by regeneration air from source 70 and the resulting mixture passes to regenerator 72 where the bulk of the carbon is burned off to prepare the catalyst for further use. Flue gas from the regeneration leaves regenerator 72 through a system of cyclones 75 and line 77. Dip-leg 79 is provided for return of the catalyst disengaged in the cyclones to the fluidized catalyst bed.

The regenerator 72 is also provided with the catalyst tap line 81 which can bring a small portion of metal-containing catalyst to the demetallization system, represented by the box 84. The apparatus represented by 84 is sufficient to perform one or more of the demetallization procedures described above. Line 88 is provided for return of the demetallized catalyst to the regenerator standpipe 16.

The reaction conditions are adjusted according to the charge stock and the conversion level desired. The reaction temperature may be in the range of about 850° F. to 1050° F. or higher, the catalyst-to-oil ratio is in the range of about 10:1 to 25:1 and the weight hourly space velocity is in the range of about 5 to 60.

*Example*

The following example is illustrative of the invention but should not be considered limiting. In the demetallization operations described below, washing is conducted with a 20% slurry of catalyst in an aqueous medium comprising tap water. The washing is followed by filtration and reslurrying twice in tap water before a final rinse. Each catalyst sample is dried in an oven at about 500° F. before analysis.

Halloysite clay containing about 49% $Al_2O_3$ and 51% $SiO_2$ was crushed and leached with sulfuric acid at about 205° F. for 5 hours. The leached clay was water-washed, dried and sized and contained about 40% alumina and about 60% silica. This substrate, having a fluidizable particle size is placed in a chamber containing a concentrated aqueous ammonium alum ($NH_4Al[SO_4]_2$) solution. Ammonia water is added to this solution until about 15 parts of alumina per 100 parts of substrate are deposited on the substrate. This composite is then removed from the solution, washed, dried and calcined.

The catalyst is sent to a progressive flow cracking zone, mixed with a preheated blend of Wyoming and Mid-Continent virgin gas oils having a gravity API of about 27 and a boiling range of about 500 to 1000° F. The temperature of the progressive reactor varies from about 950 to 1000° F. and a catalyst-to-oil ratio of about 7 to 9/1 is used. About halfway through the reaction zone heavy recycle gas oil is introduced at about 14–18 catalyst-to-oil ratio. This recycle gas oil boils within the range of about 650 to 950° F. About three-quaters of the way through the progressive reaction zone a residual hydrocarbon feedstock containing about 20 p.p.m. Ni, and 30 p.p.m. V, and API gravity of about 18°, a Conradson carbon content of about 7% and a boiling range of about 1000 to 1400° F. is introduced at a catalyst-to-oil ratio of about 70 to 90/1.

When the metals level on the catalyst reaches about 1000 p.p.m. NiO and 2200 p.p.m. $V_2O_5$ diversion of a small amount of catalyst from the regenerator to the demetallization system is begun. In the demetallization unit the catalyst is held in air for one hour at about 1275° F., sulfided for an hour with $H_2S$ at about 1150° F. and treated with chlorine gas for an average residence time of about 10 minutes. The catalyst is then treated with water about 25% saturated with $H_2S$. This demetallization treatment removes about 60% of the nickel and 35% of the vanadium from the catalyst which is returned to the regenerator standpipe. It is found that demetallization treatment of about 0.9 pound of catalyst per barrel of fresh feedstock, along with the usual 0.2 pound per barrel stack loss of catalyst serves to maintain the equilibrium metals level and keep the relative activity of the catalyst at about 31.7.

It is claimed:

1. A method for cracking hydrocarbons which comprises introducing a suspension of finely divided catalyst in the vapors of hydrocarbons boiling in the gas oil range at a catalytic cracking temperature into an elongated reaction path and at a later point in the said reaction path introducing a normally liquid heavy hydrocarbon containing more than about one p.p.m. nickel and collecting the products of said reaction, said catalyst consisting essentially of about 10 to 65% total alumina and being prepared by the addition of about 3 to 100 parts by weight of a synthetic alumina hydrate gel to 100 parts of a solid silica-alumina substrate.

2. The method of claim 1 in which catalyst contains about 9 to 20% synthetic alumina hydrate gel added to the substrate.

3. The method of claim 1 in which the catalyst contains about 15 to 50% total alumina.

4. The method of claim 1 in which the substrate is an acid-activated clay.

5. The method of claim 1 in which the nickel-containing feedstock contains residual hydrocarbons.

6. A method for producing gasoline in an elongated upflow catalytic cracking reaction path which comprises feeding to the reaction path, held at a temperature of about 750 to 1200° F. and at a pressure of about atmospheric to 100 p.s.i.g., a mixture of finely divided catalyst consisting essentially of about 10 to 65% total alumina and being prepared by the addition of about 3 to 100 parts by weight of a synthetic alumina hydrate gel to 100 parts of a silica-alumina substrate, mixed with petroleum hydrocarbons boiling in the gas oil range containing less than about 1 p.p.m. metal contaminants and comprising about 50 to 99% of the total feed, at a later point in the reaction path introducing a heavier gas oil containing more than about one p.p.m. nickel and two p.p.m. vanadium, separating catalyst from the hydrocarbon effluent of the reaction path and recovering hydrocarbon products, the conversion of the feedstock into products boiling in the gasoline range being about 40 to 60%, passing catalyst to a regeneration zone where carbon is burned from the catalyst to a catalyst carbon content of less than about 1.2%, bleeding a portion of catalyst containing NiO and $V_2O_5$ from the cracking-regeneration system, removing vanadium from the catalyst and returning demetallized catalyst to the cracking-regeneration system.

7. The method of claim 6 in which vanadium is removed from the catalyst by holding bled catalyst in air at about 1000 to 1800° F. to convert vanadium on the catalyst to a higher valence state, chlorinating the air-treated catalyst with a substantially anhydrous chlorinating agent at about 300 to 1000° F., nd washing the chlorinated catalyst with an aqueous medium to remove metal chloride from the catalyst.

8. A method for producing gasoline in an elongated upflow catalytic cracking reaction path which comprises feeding to the reaction path, held at a temperature of about 750 to 1200° F. and at a pressure of about atmospheric to 100 p.s.i.g., a mixture of finely divided catalyst consisting essentially of about 10 to 65% total alumina and being prepared by the addition of about 3 to 100 parts by weight of a synthetic alumina hydrate gel to 100 parts of a silica-alumina substrate, mixed with a first petroleum hydrocarbon fraction boiling in the gas oil range containing less than about 1 p.p.m. metal contaminants and comprising about 50 to 99% of the total feed, at a later point in the reaction path introducing a heavier hydrocarbon feedstock containing more than about one p.p.m. nickel and 2 p.p.m. vanadium separating catalyst from the hydrocarbon effluent of the reaction path and recovering hydrocarbon products, the conversion of the feedstock into products boiling in the gasoline range being about 40 to 60%, passing catalyst to a regeneration zone where carbon is burned from the catalyst to a catalyst carbon content of less than about 1.2%, bleeding a portion of catalyst containing NiO and $V_2O_5$ from the cracking-regeneration system, holding bled catalyst in air at about 1000 to 1800° F. to convert vanadium on the catalyst to a higher valence state, contacting the air-treated catalyst with $H_2S$ gas at a temperature of about 500 to 1500° F., chlorinating the sulfided catalyst with a substantially anhydrous chlorinating agent at about 300 to 1000° F., washing the chlorinated catalyst with an aqueous medium to remove metal chloride from the catalyst and returning demetallized catalyst to the cracking-regeneration system.

9. A method for producing gasoline in an elongated upflow catalytic cracking reaction path which comprises feeding to the reaction path, held at a temperature of about 750 to 1200° F. and at a pressure of about atmospheric to 100 p.s.i.g., a mixture of finely divided catalyst consisting essentially of about 10 to 65% total alumina and being prepared by the addition of about 3 to 100 parts by weight of a synthetic alumina hydrate gel to 100 parts of a silica-alumina substrate, mixed with a first petroleum hydrocarbon fraction boiling in the gas oil range containing less than about 1 p.p.m. metal contaminants and comprising about 50 to 99% of the total feed, at a later point in the reaction bath introducing a second, heavier gas oil boiling within the range of about 650 to 950° F., at a still later point in the reaction path introducing a residual hydrocarbon feedstock containing more than about one p.p.m. nickel and 2 p.p.m. vanadium, separating catalyst from the hydrocarbon effluent of the reaction path and recovering hydrocarbon products, the conversion of the feedstock into products boiling in the gasoline range being about 40 to 60%, passing catalyst to a regeneration zone where carbon is burned from the catalyst to a catalyst carbon content of less than about 1.2%, bleeding a portion of catalyst containing NiO and $V_2O_5$ from the cracking-regeneration system, holding bled catalyst in air at about 1000 to 1800° F. to convert vanadium on the catalyst to a higher valence state, contacting the air-treated catalyst with $H_2S$ gas at a temperature of about 500 to 1500° F., chlorinating the sulfided catalyst with a substantially anhydrous chlorinating agent at about 300 to 1000° F., washing the chlorinated catalyst with an aqueous medium to remove metal chloride from the catalyst and returning demetallized catalyst to the cracking-regeneration system.

10. The method of claim 9 in which the residual hydrocarbon feedstock contains about 1 to 15 p.p.m. Ni and about 2–30 p.p.m. V.

11. The method of claim 9 in which the reaction path is held at a temperature of about 850 to 1050° F.

12. The method of claim 9 in which the first fraction comprises about 75 to 99% of the feed.

13. The method of claim 9 in which the first added fraction is mixed with catalyst at a catalyst-to-oil ratio of about 7 to 9/1, and the residual feedstock is added in a catalyst-to-oil ratio of about 70 to 90/1.

References Cited by the Examiner
UNITED STATES PATENTS

| | | | |
|---|---|---|---|
| 2,488,744 | 11/49 | Snyder | 208—113 |
| 2,908,630 | 10/59 | Friedman | 208—153 |
| 2,935,463 | 5/60 | Secor et al. | 208—153 |
| 3,122,497 | 2/64 | Erickson | 208—120 |

ALPHONSO D. SULLIVAN, *Primary Examiner*.